US009550937B2

United States Patent
Campbell et al.

(10) Patent No.: US 9,550,937 B2
(45) Date of Patent: Jan. 24, 2017

(54) METHODS AND COMPOSITIONS FOR DECREASING THE VISCOSITY OF HYDROCARBON-BASED FLUIDS DURING REFINING

(71) Applicant: BAKER HUGHES INCORPORATED, Houston, TX (US)

(72) Inventors: Koral B. Campbell, Houston, TX (US); Jerry J. Weers, Richmond, TX (US)

(73) Assignee: Baker Hughes Incorporated, Houston, TX (US)

( * ) Notice: Subject to any disclaimer, the term of this patent is extended or adjusted under 35 U.S.C. 154(b) by 239 days.

(21) Appl. No.: 14/448,404

(22) Filed: Jul. 31, 2014

(65) Prior Publication Data

US 2016/0032161 A1    Feb. 4, 2016

(51) Int. Cl.
| | | |
|---|---|---|
| C09K 8/584 | (2006.01) | |
| C10G 29/20 | (2006.01) | |
| C10G 21/06 | (2006.01) | |
| C09K 8/58 | (2006.01) | |
| C10L 1/02 | (2006.01) | |

(52) U.S. Cl.
CPC .............. C09K 8/58 (2013.01); C10G 29/20 (2013.01); C10L 1/02 (2013.01); C09K 8/584 (2013.01); C10G 2300/302 (2013.01)

(58) Field of Classification Search
CPC ........... C10L 2230/14; Y10T 137/0391; C10G 2300/802; C10G 29/20; C10G 2300/302; C09K 8/58; C09K 8/582; C09K 8/584
See application file for complete search history.

(56) References Cited

U.S. PATENT DOCUMENTS

| | | | | | |
|---|---|---|---|---|---|
| 4,640,767 | A | * | 2/1987 | Zajic ....................... | C10G 1/00 166/246 |
| 4,793,826 | A | * | 12/1988 | Hayes ................. | B01F 17/0085 431/2 |
| 4,795,478 | A | * | 1/1989 | Layrisse R. ............ | C10L 1/328 137/13 |
| 4,943,390 | A | * | 7/1990 | Hayes ................. | B01F 17/0085 210/925 |
| 4,978,365 | A | * | 12/1990 | Gregoli ................. | B01F 5/0617 137/13 |

(Continued)

FOREIGN PATENT DOCUMENTS

WO    WO 02062495 A1 *  8/2002  ............ B01D 17/00

OTHER PUBLICATIONS

"Biotechnology in petroleum recovery the microbial EOR" by Ramkrishna Sen Progress in Energy and Combustion Science 34 (2008) 714-724.*

(Continued)

*Primary Examiner* — Pamela H Weiss
(74) *Attorney, Agent, or Firm* — Mossman, Kumar & Tyler, P.C.

(57) ABSTRACT

At least one biosurfactant may be added to a hydrocarbon-based fluid to decrease the viscosity of the hydrocarbon-based fluid. The biosurfactant(s) may be less toxic to the environment than other diluents typically used to decrease the viscosity of such fluids. The biosurfactant(s) may be or include, but are not limited to mycolic acids, glycolipids, lipopolysaccharides, lipoproteins-lipopeptides, phospholipids, and combinations thereof.

9 Claims, 1 Drawing Sheet

(56) References Cited

U.S. PATENT DOCUMENTS

| | | | | |
|---|---|---|---|---|
| 5,297,625 | A | * | 3/1994 | Premuzic ................. C09K 8/58 |
| | | | | 166/246 |
| 5,866,376 | A | * | 2/1999 | Rocha .................... C07H 15/04 |
| | | | | 435/100 |
| 5,968,349 | A | * | 10/1999 | Duyvesteyn ........... C10G 32/00 |
| | | | | 208/390 |
| 6,033,901 | A | | 3/2000 | Powell, Jr. |
| 7,052,901 | B2 | * | 5/2006 | Crews .................... C09K 8/605 |
| | | | | 435/262 |
| 7,484,560 | B2 | | 2/2009 | Lal et al. |
| 2009/0082227 | A1 | * | 3/2009 | Hnatow ................. C02F 3/344 |
| | | | | 507/201 |
| 2009/0090658 | A1 | * | 4/2009 | Burkus ................. C10G 1/047 |
| | | | | 208/390 |
| 2011/0139262 | A1 | * | 6/2011 | Aburto Anell .......... C10L 1/328 |
| | | | | 137/13 |
| 2012/0161070 | A1 | * | 6/2012 | Webber ................. C07C 237/06 |
| | | | | 252/182.29 |
| 2012/0301940 | A1 | * | 11/2012 | Bin Mohd Yahya .. C10G 32/00 |
| | | | | 435/166 |
| 2013/0048079 | A1 | * | 2/2013 | Ovalles .................... C07C 7/20 |
| | | | | 137/1 |
| 2013/0062053 | A1 | * | 3/2013 | Kohr ...................... C09K 8/582 |
| | | | | 166/246 |
| 2013/0331466 | A1 | | 12/2013 | Gross et al. |

OTHER PUBLICATIONS

"Biosurfactants and their Use in Upgrading Petroleum Vacuum Distillation Residue: A Review" by Mazaheri Assaidi, M. and Tabatabace, M.S. Int J. Environ. Res. 4(4): 549-572, Autumn 2010.*

* cited by examiner

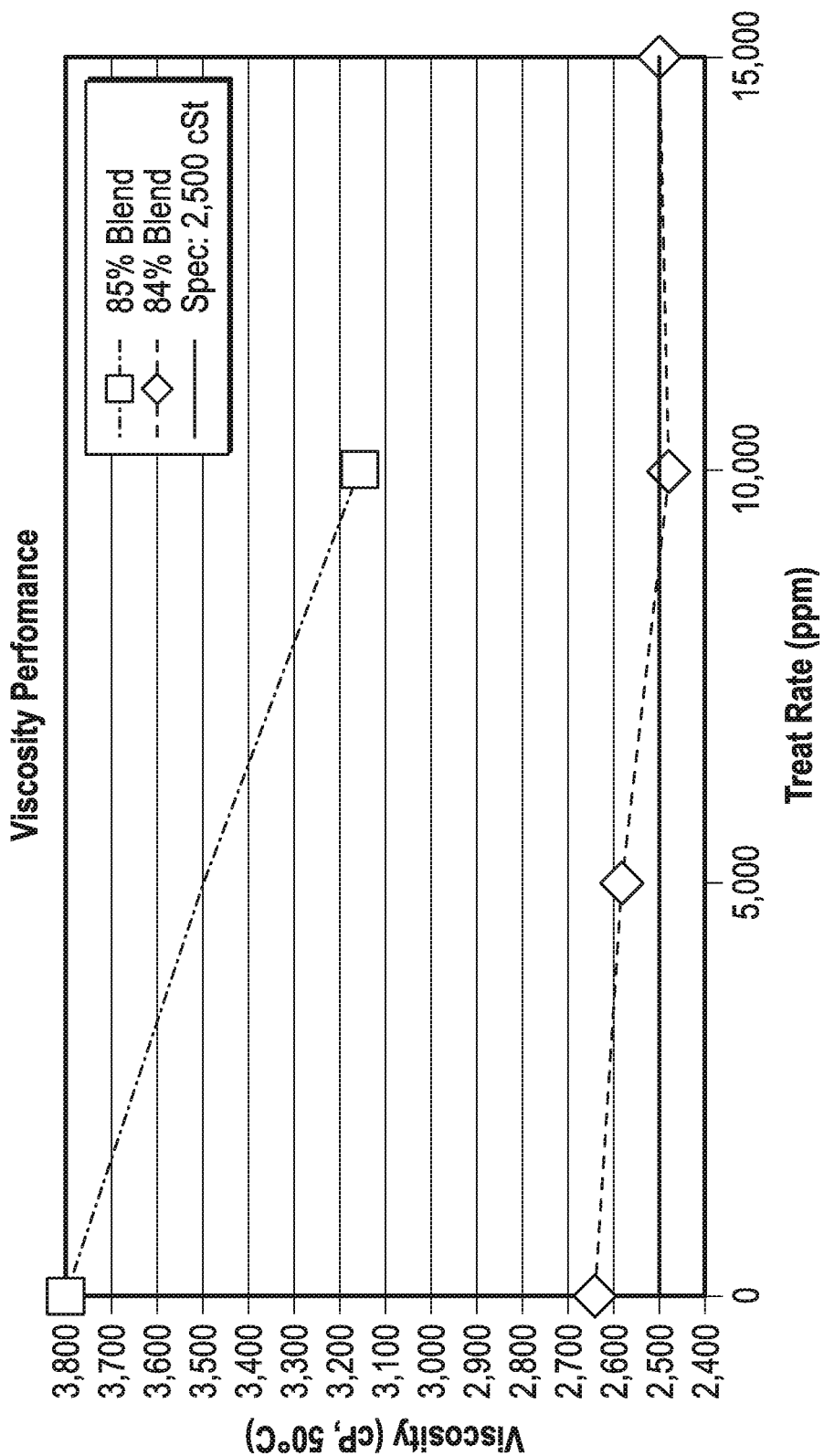

METHODS AND COMPOSITIONS FOR DECREASING THE VISCOSITY OF HYDROCARBON-BASED FLUIDS DURING REFINING

TECHNICAL FIELD

The present invention relates to fluid compositions and methods by adding biosurfactants to at least one hydrocarbon-based fluid for decreasing the viscosity thereof.

BACKGROUND

Refining is the process of treating raw hydrocarbon (e.g. crude oil) and its conversion into lighter, higher octane number components. Crude oil is the starting point for many diverse products, such as motor oil and gasoline, but also clothes, medical equipment, electronics, vitamin capsules, tires, etc.

During the course of refining crude oil, the crude oil and resultant process streams may be subjected to separation (e.g. distillation), conversion (e.g. thermal cracking), purification, and various other treatments. Distillation is often the first step to separate the crude oil into unfinished products, which occurs by applying heat (as high as 750 F) to a stream of crude oil. The bottom product of each distillation tower may feed the next distillation tower. The tower bottom products are typically the components of the crude oil or refinery fluid that are still liquid at such elevated temperatures.

During distillation, the higher boiling compounds that may have a higher molecular weight and/or greater viscosity are separated from lower boiling compounds. After removal of the distillate, the resulting bottoms may be subjected to further processes, such as conversion and/or purification. Conversion processes include fluidized catalytic crackers, cokers, hydrocrackers, and the like. The conversion processes 'convert' or alter the structure of the hydrocarbon chain within a particular process stream.

The atmospheric or vacuum tower bottoms (VTBs), also known as 'resid', are the final bottom products from distillation. The VTBs may be processed in cokers to be upgraded into gasoline, diesel, and gas oil. The VTBs are the heaviest material in the refinery. Some VTBs are sold into the paving asphalt market as a blend component. The VTBs (a heavy hydrocarbon material) may also be further converted into more valuable products by using high temperature to break the hydrocarbon chains within the VTBs by using a coker, such as a delayed coker.

Unfortunately, as the viscosity of the process stream (e.g. a heavy hydrocarbon in a non-limiting embodiment) increases, the handling, moving, and/or further refining of the process stream becomes more difficult. For example, the VTBs may even solidify and block fluid movement within a process stream in some circumstances.

Diluents are typically added to the hydrocarbon fluid or stream to dilute the fluid and thereby decrease the viscosity to prevent solidification and/or increase fluid movement within the process stream. Common or traditional diluents are also hydrocarbon-based, such as a distillation tower cut, e.g. naphtha, which may be used for dilution and transportation of the heavy hydrocarbon. However, such diluents are difficult to handle and are highly regulated.

It would be desirable if less diluent could be added to the hydrocarbon fluid to decrease the viscosity of the hydrocarbon-based fluid. It would also be desirable if agents could be devised for decreasing the viscosity of the hydrocarbon-based fluid that are more environmentally friendly alternatives to traditional diluents.

SUMMARY

There is provided, in one form, a method for decreasing a viscosity of a hydrocarbon-based fluid by adding an effective amount of at least one biosurfactant to the hydrocarbon-based fluid to decrease the viscosity thereof as compared to an otherwise identical hydrocarbon-based fluid. The biosurfactant(s) may be or include, but are not limited to, mycolic lipids, glycolipids, lipopolysaccharides, lipoproteins-lipopeptides, phospholipids, and combinations thereof.

In a non-limiting embodiment of the method, the biosurfactant may include at least one sophorolipid. The hydrocarbon-based fluid may be or include, but is not limited to, atmospheric or vacuum tower bottoms, bitumen, crude oil, vacuum tower bottoms derived fuel, and combinations thereof.

There is further provided, in another form, a fluid composition having a hydrocarbon-based fluid and at least one biosurfactant. The biosurfactant(s) may be or include, but are not limited to, mycolic lipids, glycolipids, lipopolysaccharides, lipoproteins-lipopeptides, phospholipids, and combinations thereof. The fluid composition may have a decreased viscosity as compared to an otherwise identical hydrocarbon-based fluid absent the at least one biosurfactant.

In a non-limiting embodiment of the fluid composition, the hydrocarbon-based fluid may be or include atmospheric or vacuum tower bottoms, bitumen, crude oil, vacuum tower bottoms derived fuel, and combinations thereof. The biosurfactant may be or include at least one sophorolipid. The fluid composition my also include at least one diluent. A decreased amount of the diluent may be present in the fluid composition to obtain a pre-determined viscosity as compared to an otherwise identical fluid composition absent the at least one biosurfactant.

The biosurfactant(s) additives are less-toxic alternatives to other diluents and may decrease the viscosity of the hydrocarbon-based fluid.

BRIEF DESCRIPTION OF THE DRAWING

FIG. 1 illustrates the viscosity for the 85% VPS blend and 86% VPS blend depending on the concentration of additive added thereto.

DETAILED DESCRIPTION

It has been discovered that an effective amount of at least one biosurfactant may be added to a hydrocarbon-based fluid to form a treated hydrocarbon-based fluid having a decreased viscosity as compared to an otherwise identical hydrocarbon-based fluid absent the biosurfactant(s). The biosurfactant(s) may be added to the hydrocarbon-based fluid by injecting the biosurfactant(s), mixing the biosurfactant(s), and the like. The biosurfactant(s) may be added as a single batch, a continuous batch, two or more batches, and combinations thereof. Biosurfactants are defined as surface-active substances synthesized by living cells.

In addition to being biodegradable, the biosurfactants may be less toxic compared to other diluents. The use of biosurfactants in hydrocarbon-based fluids may provide a more environmentally friendly alternative to diluents traditionally used for lowering the viscosity of the hydrocarbon-based fluids. The diluent(s) typically used to modify the viscosity of the hydrocarbon-based fluid my be refinery distillates from other units, such as a crude distillation tower, a fluid catalytic cracking unit, a hydrotreater, a coker, and combinations thereof.

By decreasing the viscosity of the hydrocarbon-based fluid, a diluent may be added to the hydrocarbon-based fluid in a decreased amount as compared to an otherwise identical fluid absent the biosurfactant(s). The amount of the diluent added to the hydrocarbon-based fluid may be decreased by about 1% by volume independently to about 50% by volume as compared to an otherwise identical hydrocarbon-based fluid absent the biosurfactant(s), alternatively from about 2% independently to about 20%, or from about 5% independently to about 10%.

The biosurfactants may be 'added' to the hydrocarbon-based fluid by adding the biosurfactants directly to the hydrocarbon-based fluid, adding the biosurfactant to the diluent and then adding the diluent to the hydrocarbon-based fluid, and combinations thereof. The biosurfactants may be added to the residual or bottoms stream or to the diluent stream before the two come together to make the final blend in a non-limiting embodiment. When adding a diluent to the hydrocarbon-based fluid, it may be beneficial to have the biosurfactant dissolved in the hydrocarbon-based fluid and/or the diluent before the hydrocarbon-based fluid and diluent come together. The biosurfactant may be added by injecting the biosurfactant into the hydrocarbon-based fluid and/or diluent where the injection may occur at a location in front of, but not limited to, a pump, a valve, a heat exchanger, and the like. The injection may improve dispersion of the biosurfactant(s) into the fluid, but is not required.

The biosurfactant(s) may be or include, but are not limited to, mycolic lipids, glycolipids, lipopolysaccharides, lipoproteins-lipopeptides, phospholipids, and combinations thereof. In a non-limiting embodiment, the biosurfactant(s) may be or include, but not limited to, a sophorolipid, a rhamnolipid, a mannosylerythritol lipid, a trehalose lipid, a cellobiose lipid, a serrawettin, a polyol lipid, an ornithine lipid, a viscosin, a carbohydrate-lipid, a protein polyamine, a diglycosyl diglyceride, a fatty acid, a neutral lipid, a liposan, a surfactin/iturin, a subtilisin, an aminoacid lipid, a lichenysin, a peptide lipid, a phospholipid, vesicles & fimbriae, an emulsan, an alasan, and combinations thereof.

Sophorolipids may be manufactured from corn (or other grain-based media) and vegetable oil with variations in the process being dependent on the natural and non-pathogenic yeast strand and production medium. As such, sophorolipids are naturally occurring bio-surfactant glycolipids produced from yeasts. For instance, the sophorolipids are glycolipids produced fermentatively from such yeasts including, but not necessarily limited to, *Candida bombicola, Candida apicola*, and *Wickerhamiella domercqiae*. Sophorolipids are generally composed of a dimeric sophorose sugar moiety (β-D-Glc-(1→2)-D-Glc) linked glycosidically to a hydroxyl fatty acid residue. In a non-limiting embodiment, a sophorose sugar moiety is linked via the glycosidic linkage to the hydroxyl group of a 17-hydroxy-C18 saturated or monoenoic (cis-9) fatty acid.

Depending on the pH of the system, sophorolipids may be or include a circular, lactonic sophorolipid form or a linear, acidic sophorolipid form. The 6-hydroxyl groups of the glucose moieties may be acetylated. Depending upon the organism and the fermentation conditions used to produce the sophorolipid, the acidic or lactone form may predominate.

In a non-limiting embodiment, the biosurfactant additive may include a sophorolipid having a structure represented by the formulas (I), (II), (III), (IV), and combinations thereof:

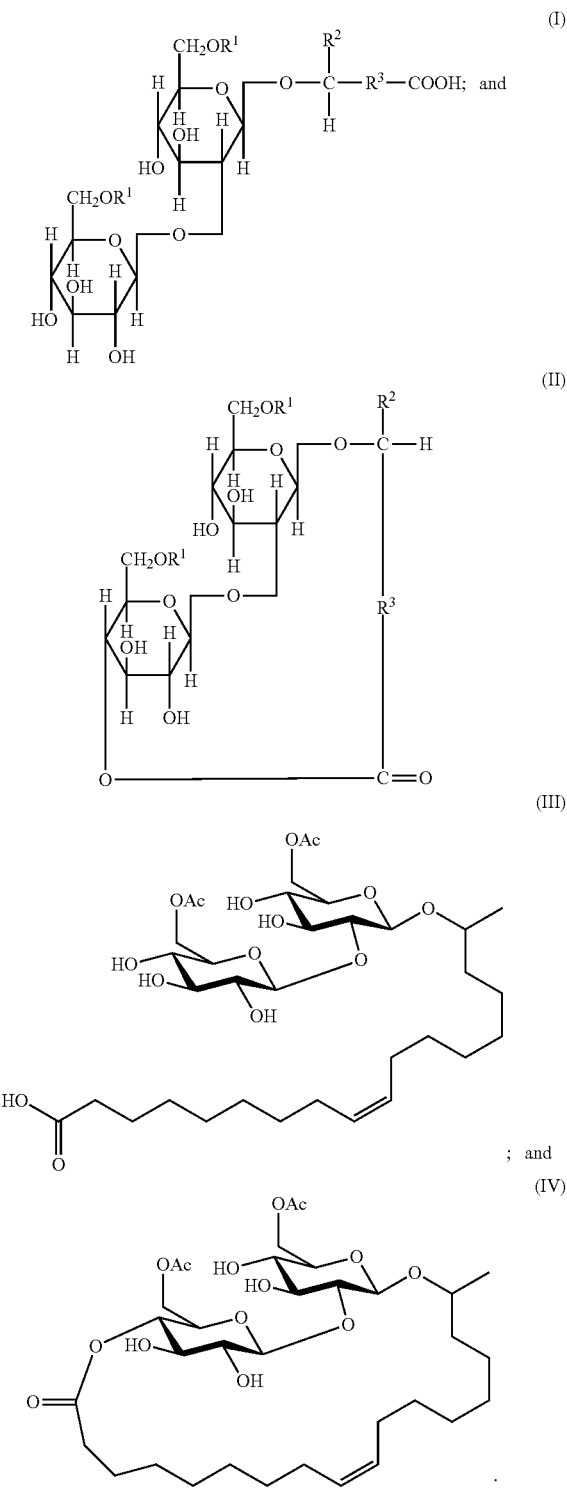

where: $R^1$ is hydrogen or an acetyl group; and either
a. $R^2$ is hydrogen or a $C_1$-$C_9$ saturated or unsaturated aliphatic group; and $R^3$ is a $C_7$-$C_{16}$ saturated or unsaturated aliphatic group; or b. $R^2$ is hydrogen or methyl and $R^3$ is a saturated or unsaturated hydrocarbon chain that contains from 12 to 18 carbon atoms, alternatively from about 13 to about 17 carbon atoms.

As illustrated, the hydroxyl fatty acid moiety of the acidic sophorolipids may remain a free acid (I) or form a macrocyclic lactone ring with the 4"-OH group of the sophorose lactone form (II). Such sophorolipidic compounds may be prepared by conventional methods known in the art, such as those disclosed in U.S. Pat. No. 5,879,913, herein incorporated by reference in its entirety.

The dry solids of materials made from such processes may range from about 20% independently to about 100% sophorolipid, alternatively from about 40% independently to about 99%, about 50% independently to about 95%, or greater than about 90%. In one non-limiting embodiment, the reaction product may also include some free fatty acids and an amount of vegetable oil. The free fatty acids may be present in an amount ranging from 0% independently to about 10%, alternatively less than about 5% in another non-limiting embodiment. As used herein with respect to a range, "independently" means that any threshold may be used together with another threshold to give a suitable alternative range, e.g. about 20% independently to about 40% is also considered a suitable alternative range.

In a non-limiting embodiment, the biosurfactant additive may include at least a second component, such as a dilution component, a second biosurfactant different from a first biosurfactant, a non-biosurfactant, a co-surfactant, a basic amine derivative, and combinations thereof. One non-limiting combination of the biosurfactant additive having two biosurfactants is a rhamnolipid and a sophorolipid combination.

The dilution component may be or include, but is not limited to a glycerol, a polyethylene glycol, vegetable oil, butyl carbitol, isopropanol, ethanol, methanol, alcohols, glycols, diols, or glycol ethers including those that generally contain a hydroxyl group or multiple hydroxyl groups, and combinations thereof.

Such alcohols, glycols, diols, or glycol ethers may be selected from, in non-limiting embodiments, Lutrol 9™; Macrogol 400 BPC™; Monoethylene glycol; Tescol™; 1,2-Dihydroxyethane, 2-Hydroxyethanol; $HOCH_2CH2OH$, Dihydroxyethane; Ethanediol; Glygen; Ethane-1,2-diol; Fridex; Ucar 17; Aliphatic diol; Ilexan E™; methanol, ethanol, ethylene alcohol, propanol, isopropanol, butanol, ethylene glycol, propylene glycol, butylene glycol, hexylene glycol, diethylene glycol, dipropylene glycol, triethylene glycol, tripropylene glycol, propylene glycol methyl ether, dipropylene glycol methyl ether, tripropylene glycol methyl ether, propylene glycol propyl ether, dipropylene glycol propyl ether, tripropylene glycol propyl ether, propylene glycol butyl ether, dipropylene glycol butyl ether, tripropylene glycol butyl ether, propylene glycol phenyl ether, dipropylene glycol dimethyl ether, diethylene glycol ethyl ether, diethylene glycol methyl ether, diethylene glycol butyl ether, diethylene glycol hexyl ether, ethylene glycol propyl ether, ethylene glycol butyl ether, ethylene glycol hexyl ether, triethylene glycol methyl ether, triethylene glycol ethyl ether, triethylene glycol butyl ether, ethylene glycol phenyl ether, ethylene glycol ethyl ether, polyethylene glycol, monosaccharide, polypropylene glycol, dimethyl sulfoxide, glycerol, glycerine, copolymers thereof, and combinations thereof, and combinations thereof.

In a non-limiting embodiment, the diluent may be an aromatic solvent or a petroleum based solvent. The aromatic solvent may be or include a benzene, a toluene, an ethyl-benzene, xylene, and combinations thereof. The petroleum based solvent may be or include, but is not limited to gas oils, diesel fuels, kerosene, and combinations thereof.

The ratio of the dilution component to the biosurfactant(s) added to the hydrocarbon-based fluid may range from about 0.1 vol % independently to about 99.9 vol % of the dilution component and from about 40 vol % to about 99.9 vol % of the biosurfactant(s). A dilution component may be used with the biosurfactant(s) for dilution of the biosurfactant(s) to decrease the amount of the biosurfactant(s) necessary, but the diluted biosurfactant(s) achieves the same effect as if the biosurfactant had not been diluted. The dilution of the biosurfactant is optional, and the amount to which the biosurfactant may be diluted depends on the purity of the biosurfactant used.

The basic amine derivative may be or include, but is not limited to, an alkanolamine. The alkanolamine may have the formula: $RN(CHR'CH_2OH)_2$ where R and R' are independently $C_1$-$C_{18}$ alkyl or $CH_2CH_2OH$. Non-limiting examples of the basic amine derivative may be or include a polyamine, such as but not limited to tetraethylenepentamine, triethylenetetramine, diethylenetriamine or an amine condensation reaction product (e.g. imidazoline) and combinations thereof.

In a non-limiting embodiment, the effective amount of the non-diluted biosurfactant(s) may range from about 1 ppm independently to about 15,000 ppm, alternatively from about 1,000 ppm independently to about 10,000 ppm, or from about 5,000 ppm independently to about 7,000 ppm in another non-limiting embodiment.

The biosurfactant(s) may then be added to the hydrocarbon-based fluid, such as but not limited to, atmospheric or vacuum tower bottoms, bitumen, heavy crude oil, atmospheric or vacuum tower bottoms derived fuel, feedstocks to upgrader units where the upgrader units may be or include cokers, vis-breakers and resid hydrotreaters, and combinations thereof. Non-limiting examples of vacuum tower bottoms derived fuel include 6 oil (marine oil), asphalt, decant oil, and combinations thereof. Decant oil is the bottoms from a fluid catalytic cracking unit. Decant oil may also be used as a blend component in residual fuels.

It is difficult to predict the exact conditions of the hydrocarbon-based fluid in advance; however, when adding the biosurfactant(s) to the hydrocarbon-based fluid, the temperature of the hydrocarbon-based fluid may range from about 110 F to about 450 F. In a non-limiting embodiment, the temperature may range from about 250 F independently to about 450 F for an asphalt fluid, alternatively from about 275 F independently to about 325 F. In another non-limiting embodiment, the temperature may range from about 110 F independently to about 200 F for other non-asphaltic hydrocarbon-based fluids, alternatively from about 115 F independently to about 130 F.

The invention will be further described with respect to the following Example, which is not meant to limit the invention, but rather to further illustrate the various embodiments.

EXAMPLE 1

A sample of vacuum pipe still bottom (VPS) was collected from a US gulf coast refinery. The sample was split into 8 separate portions and treated with varying amounts of a sophorolipid surfactant additive. The first sample included 90 vol % VPS, 10 vol % of a diluent, and no additive was added thereto. The second sample included 80 vol % VPS, 20 vol % of a diluent, and no additive was added thereto. The third sample included 85 vol % VPS, 15 vol % of a diluent, and no additive was added thereto. The fourth sample included 85 vol % VPS, 15 vol % of a diluent, and 10,000 ppm additive was added thereto. The fifth sample included 84 vol % VPS, 16 vol % of a diluent, and no additive was added thereto. The sixth sample included 84 vol % VPS, 16 vol % of a diluent, and 5,000 ppm additive was added thereto. The seventh sample included 84 vol % VPS, 16 vol % of a diluent, and 10,000 ppm additive was added thereto. The eighth sample included 84 vol % VPS, 16 vol % of a diluent, and 15,000 ppm additive was added thereto. No other additives were added to samples 1-8, besides the sophorolipid additive where mentioned.

The testing was repeated, and the efficacy of this testing was found to be is ±80 cSt. As noted by Table 1, the sophorolipid additive decreased the viscosity for samples 4-8 by varying amounts. FIG. 1 illustrates the viscosity for the 85% VPS blend and 86% VPS blend depending on the concentration of additive added thereto.

TABLE 1

Viscosity performance of Sophorolipid Additive

| Blend Ratio | | | | | |
|---|---|---|---|---|---|
| VPS (%) | Aromatic Solvent (%) | Additive | Treat Rate (ppm) | Viscosity (cSt, 50° C.) | Improvement (%) |
| 90 | 10 | — | — | 14,000 | — |
| 80 | 20 | — | — | 1,200 | — |
| 85 | 15 | — | — | 3,760/3,840 | — |
| 85 | 15 | Sophorolipid | 10,000 | 3,160 | 16.8 |
| 84 | 16 | — | — | 2,640 | — |
| 84 | 16 | Sophorolipid | 5,000 | 2,580 | 2.3 |
| 84 | 16 | Sophorolipid | 10,000 | 2,480 | 6.1 |
| 84 | 16 | Sophorolipid | 15,000 | 2,500 | 5.3 |

In the foregoing specification, the invention has been described with reference to specific embodiments thereof, and has been described as effective in providing methods and fluid compositions for using biosurfactant additives with downhole fluids. However, it will be evident that various modifications and changes can be made thereto without departing from the broader spirit or scope of the invention as set forth in the appended claims. Accordingly, the specification is to be regarded in an illustrative rather than a restrictive sense. For example, specific biosurfactants, diluents, hydrocarbon-based fluids, and sophorolipids falling within the claimed parameters, but not specifically identified or tried in a particular composition or method, are expected to be within the scope of this invention.

The present invention may suitably comprise, consist or consist essentially of the elements disclosed and may be practiced in the absence of an element not disclosed. For instance, the method for decreasing a viscosity of a hydrocarbon-based fluid may consist of or consist essentially of adding an effective amount of at least one biosurfactant to the hydrocarbon-based fluid to decrease the viscosity thereof as compared to an otherwise identical hydrocarbon-based fluid; the biosurfactant(s) may be or include, but are not limited to, mycolic lipids, glycolipids, lipopolysaccharides, lipoproteins-lipopeptides, phospholipids, and combinations thereof.

The fluid composition may consist of or consist essentially a hydrocarbon-based fluid and at least one biosurfactant; the biosurfactant(s) may be or include, but are not limited to, mycolic lipids, glycolipids, lipopolysaccharides, lipoproteins-lipopeptides, phospholipids, and combinations thereof; the fluid composition may have a decreased viscosity as compared to an otherwise identical hydrocarbon-based fluid absent the at least one biosurfactant.

The words "comprising" and "comprises" as used throughout the claims, are to be interpreted to mean "including but not limited to" and "includes but not limited to", respectively.

What is claimed is:

1. A method for decreasing a viscosity of a hydrocarbon-based fluid, wherein the method comprises:
   adding an effective amount of at least one biosurfactant to the hydrocarbon-based fluid to decrease the viscosity thereof as compared to an otherwise identical hydrocarbon-based fluid; wherein the at least one biosurfactant is selected from the group consisting of mycolic lipids, glycolipids, lipopolysaccharides, lipoproteins-lipopeptides, phospholipids, and combinations thereof; and wherein the hydrocarbon-based fluid is selected from a group consisting of atmospheric or vacuum tower bottoms, bitumen, vacuum tower bottoms derived fuel, feedstocks to upgrader units, and combinations thereof;
   adding a diluent to the hydrocarbon-based fluid, wherein the diluent is selected from a group consisting of benzene, a toluene, an ethylbenzene, xylene, gas oils, diesel fuels, kerosene, and combinations thereof;
   and decreasing the viscosity of the hydrocarbon-based fluid.

2. The method of claim 1, wherein the effective amount of the at least one biosurfactant ranges from about 1 ppm to about 15,000 ppm based on the amount of the hydrocarbon-based fluid.

3. The method of claim 1, wherein the temperature of the hydrocarbon-based fluid when adding the at least one biosurfactant thereto ranges from about 110 F (about 43 C) to about 450 F (about 232 C).

4. The method of claim 1, further comprising adding an additive to the oil-based fluid at the same time or different time from the at least one biosurfactant; wherein the additive is selected from the group consisting of a dilution component, a second biosurfactant different from the at least one biosurfactant, an amine, an amine derivative, and combinations thereof.

5. The method of claim 1, wherein the at least one biosurfactant is selected from the group consisting of a sophorolipid, a rhamnolipid, a mannosylerythritol lipid, a trehalose lipid, a cellobiose lipid, a serrawettin, a polyol lipid, an ornithine lipid, a viscosin, a carbohydrate-lipid, a protein polyamine, a diglycosyl diglyceride, a fatty acid, a neutral lipid, a liposan, a surfactin/iturin, a subtilisin, an aminoacid lipid, a lichenysin, a peptide lipid, vesicles & fimbriae, an emulsan, an alasan, and combinations thereof.

6. A treated hydrocarbon-based fluid composition comprising:
   a hydrocarbon-based fluid selected from the group consisting of atmospheric or vacuum tower bottoms, bitumen, vacuum tower bottoms derived fuel, and combinations thereof;
   at least one biosurfactant selected from the group consisting of mycolic lipids, glycolipids, lipopolysaccharides, lipoproteins-lipopeptides, phospholipids, and combinations thereof;
   a diluent selected from a group consisting of benzene, a toluene, an ethylbenzene, xylene, gas oils, diesel fuels, kerosene, and combinations thereof; and
   wherein the fluid composition has a decreased viscosity as compared to an otherwise identical hydrocarbon-based fluid absent the at least one biosurfactant.

7. The fluid composition of claim 6, wherein the effective amount of the at least one biosurfactant ranges from about 1 ppm to about 15,000 ppm based on the amount of the hydrocarbon-based fluid.

8. A treated hydrocarbon-based fluid composition comprising:
- a hydrocarbon-based fluid selected from the group consisting of atmospheric or vacuum tower bottoms, bitumen, vacuum tower bottoms derived fuel, and combinations thereof;
- at least one sophorolipid;
- at least one diluent selected from a group consisting of benzene, a toluene, an ethylbenzene, xylene, gas oils, diesel fuels, kerosene, and combinations thereof; and
- wherein the fluid composition has a decreased viscosity as compared to an otherwise identical hydrocarbon-based fluid absent the at least one sophorolipid.

9. The fluid composition of claim 8, wherein the effective amount of the at least one biosurfactant ranges from about 1 ppm to about 15,000 ppm based on the amount of the hydrocarbon-based fluid.

\* \* \* \* \*